United States Patent
Akanuma et al.

(10) Patent No.: US 10,560,009 B2
(45) Date of Patent: Feb. 11, 2020

(54) VIBRATION MOTOR

(71) Applicant: Nidec Seimitsu Corporation, Ueda-shi, Nagano-ken (JP)

(72) Inventors: Tomohiro Akanuma, Ueda (JP); Mitsuru Oi, Ueda (JP); Takashi Mori, Ueda (JP); Satoshi Nakazawa, Ueda (JP)

(73) Assignee: NIDEC SEIMITSU CORPORATION, Nagano (JP)

( * ) Notice: Subject to any disclaimer, the term of this patent is extended or adjusted under 35 U.S.C. 154(b) by 280 days.

(21) Appl. No.: 15/657,307

(22) Filed: Jul. 24, 2017

(65) Prior Publication Data
US 2018/0021812 A1   Jan. 25, 2018

(30) Foreign Application Priority Data
Jul. 25, 2016   (JP) .................. 2016-145463

(51) Int. Cl.
*H02K 33/00* (2006.01)
*H02K 33/02* (2006.01)
(Continued)

(52) U.S. Cl.
CPC ............. *H02K 33/00* (2013.01); *B06B 1/045* (2013.01); *H02K 1/06* (2013.01); *H02K 5/04* (2013.01);
(Continued)

(58) Field of Classification Search
CPC ........ H02K 33/00; H02K 33/02; H02K 33/04; H02K 33/08; H02K 33/10; H02K 33/12;
(Continued)

(56) References Cited

U.S. PATENT DOCUMENTS 6,469,406 B1* 10/2002 Hwang ................ H02K 41/031
                                                          310/12.27
2008/0258567 A1* 10/2008 Mukaide ................ H02K 41/03
                                                          310/12.22
(Continued)

FOREIGN PATENT DOCUMENTS

CN        202435225 U      9/2012

OTHER PUBLICATIONS

Akanuma et al. "Vibration Motor and Method for Manufacturing the Same", U.S. Appl. No. 15/657,330, filed Jul. 24, 2017.

*Primary Examiner* — Jermele M Hollington
*Assistant Examiner* — Alexander A Singh
(74) *Attorney, Agent, or Firm* — Keating & Bennett

(57) ABSTRACT

A vibration motor includes a stationary portion including a casing and a coil; a vibrating body including a weight and a magnet, the vibrating body being supported so as to be vibratable in one direction relative to the stationary portion; an elastic member located between the stationary portion and the vibrating body; and a top plate portion that is disposed above the vibrating body in an up-down direction that is perpendicular to the one direction. The magnet is disposed above the coil, and the top plate portion faces the magnet in the up-down direction. The magnet includes a set of first magnets that generate magnetic forces that are opposite to each other in the up-down direction and one or more second magnets that are interposed between the first magnets and each generate a magnetic force in the one direction.

16 Claims, 14 Drawing Sheets

(51) Int. Cl.
*H02K 35/02* (2006.01)
*H02K 33/16* (2006.01)
*B06B 1/04* (2006.01)
*H02K 1/06* (2006.01)
*H02K 5/04* (2006.01)

(52) U.S. Cl.
CPC ............ *H02K 33/02* (2013.01); *H02K 33/16* (2013.01); *H02K 35/02* (2013.01)

(58) Field of Classification Search
CPC ........ H02K 33/14; H02K 33/16; H02K 33/18; H02K 35/00; H02K 35/02; H02K 35/04; H02K 35/06; H02K 1/34; H02K 1/06; H02K 5/04; H02K 1/12; B06B 1/045
USPC ......... 310/12.01, 12.14, 12.15, 12.16, 12.21, 310/12.22, 12.24, 12.25, 12.26, 12.27, 310/12.31, 12.32, 12.33
See application file for complete search history.

(56) References Cited

U.S. PATENT DOCUMENTS

2016/0254736 A1\* 9/2016 Jin .................. H02K 33/16
  310/25
2017/0012515 A1\* 1/2017 Xu .................. H02K 33/16

\* cited by examiner

VIBRATION MOTOR

CROSS REFERENCE TO RELATED APPLICATIONS

This application claims the benefit of priority to Japanese Patent Application No. 2016-145463 filed on Jul. 25, 2016. The entire contents of this application are hereby incorporated herein by reference.

BACKGROUND OF THE INVENTION

1. Field of the Invention

The present invention relates to a vibration motor.

2. Description of the Related Art

Vibration motors have been used in various devices, such as smartphones. An example of existing vibration motors is disclosed in CN 202435225 U.

The vibration motor described in CN 202435225 U includes a vibrating body, which includes two magnets, and a coil, which is fixed to a casing. When driving the vibration motor, a magnetic field is generated between the magnets and the coil, and the vibrating body vibrates. The vibration motor described in CN 202435225 U further includes a top plate portion. The top plate portion is disposed above the vibrating body in an up-down direction that is perpendicular to one direction in which the vibrating body vibrates. The top plate portion faces the magnets. The top plate portion functions as a back yoke for suppressing leakage of magnetic flux between the two magnets.

In recent years, haptic technology, which is a technology for transmitting information through tactile sensation, has been improved. Thus, vibration motors are required to have a function of transmitting small vibrations for tactile feedback and the like, in addition to a vibration function that has been used for silent notification.

A vibration motor used for tactile feedback and the like needs to start and stop sharply, because high responsiveness is required for such purposes. It may be possible to increase the speed of starting and stopping of the vibration motor by increasing the magnetic force of a magnet. However, in the vibration motor described in CN 202435225 U, even if the magnetic force is increased by using large magnets, it is not possible to form a magnetic path between the two magnets without increasing the thickness of the top plate portion. If the thickness of the top plate portion is increased, the thickness of the entirety of the vibration motor is increased, and reduction in the thickness of the vibration motor is hindered.

SUMMARY OF THE INVENTION

According to an exemplary embodiment of the present application, a vibration motor includes a stationary portion including a casing and a coil; a vibrating body including a weight and a magnet, the vibrating body being supported so as to be vibratable in one direction relative to the stationary portion; an elastic member located between the stationary portion and the vibrating body; and a top plate portion that is disposed above the vibrating body in an up-down direction that is perpendicular to the one direction. The magnet is disposed above the coil, and the top plate portion faces the magnet in the up-down direction. The magnet includes a set of first magnets that generate magnetic forces that are opposite to each other in the up-down direction and one or more second magnets that are interposed between the first magnets and each generate a magnetic force in the one direction.

With the vibration motor according the exemplary embodiment of the present application, it is possible to form a magnetic path without increasing the thickness of the top plate portion and to increase the magnetic force of the magnet. Accordingly, it is possible to improve the responsiveness of the vibration motor without increasing the thickness of the entirety of the vibration motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, exemplary embodiments of the present invention will be described with reference to the drawings.

1. First Embodiment

Figure 1:
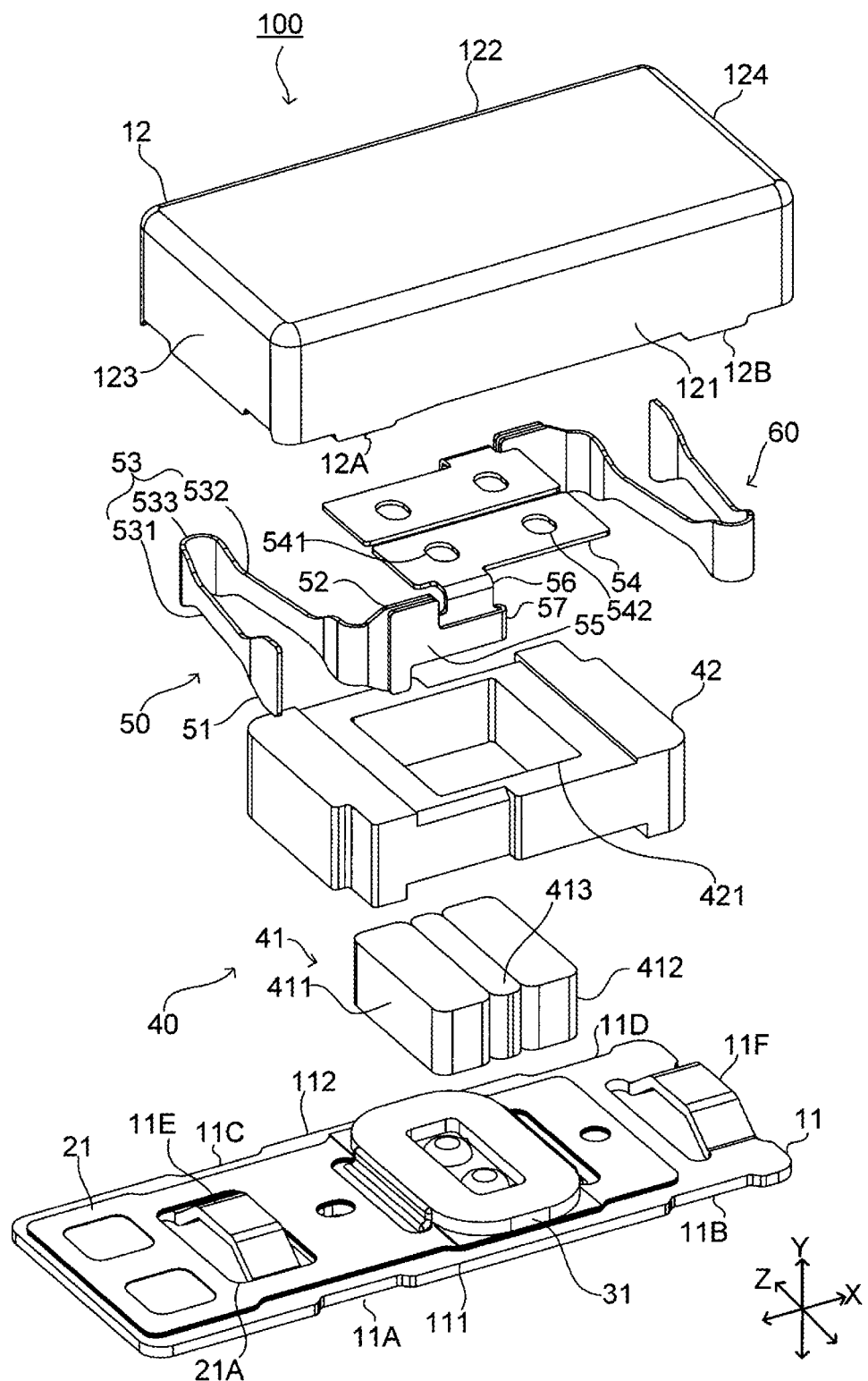
FIG. 1 is an exploded perspective view of a vibration motor according to a first embodiment of the present invention.

FIG. 1 is an exploded perspective view of a vibration motor according to a first embodiment of the present invention.

In FIG. 1, the left-right direction (one direction) is defined as a first direction, which is represented as the X-direction. The up-down direction, which is perpendicular to the first direction, is represented as the Y-direction. For example, in FIG. 1, upward along the plane of FIG. 1 is upward in the up-down direction (Y-direction). A second direction that is perpendicular to the first direction and the up-down direction is represented as the Z-direction. The same definitions apply to other figures. However, these definitions of directions do not apply to positional relationships and directions when the vibration motor is disposed in an actual device.

1-1. Overall Structure of Vibration Motor

A vibration motor 100 according to the present embodiment includes a base 11, a substrate 21, a coil 31, a vibrating body 40, an elastic member 50, an elastic member 60, and a cover 12. The vibration motor 100 includes a casing that includes the base 11 and the cover 12. The cover 12 includes a first side portion 121, a second side portion 122, a third side portion 123, and a fourth side portion 124. The second side portion 122 faces the first side portion 121, which extends in the first direction. The fourth side portion 124 faces the third side portion 123, which extends in the second direction.

The substrate 21 is a rigid substrate, a flexible substrate, or the like. The substrate 21 is fixed to an upper surface of the base 11. The coil 31 is attached to an upper surface of the substrate 21. The coil 31 is bonded to the upper surface by, for example, using an adhesive. Alternatively, the coil 31 may be fixed to the substrate 21 by using a method other than adhesive bonding.

The casing, the substrate 21, and the coil 31 constitute a stationary portion. That is, the vibration motor 100 includes a stationary portion that includes the casing and the coil 31.

The base 11 includes cutout portions 11A and 11B, which are formed in a first edge portion 111 extending in the first direction, and cutout portions 11C and 11D, which are formed in a second edge portion 112 facing the first edge portion 111. The first side portion 121 of the cover 12 includes protrusions 12A and 12B, which protrude in the downward direction. The second side portion 122 of the cover 12 includes two protrusions (not shown), which protrude in the downward direction in the same way as the protrusions 12A and 12B. The protrusions 12A and 12B are respectively fitted into the cutout portions 11A and 11B. The protrusions (not shown) of the second side portion 122 are respectively fitted into the cutout portions 11C and 11D. Thus, it is possible to position the cover 12 relative to the base 11 in the second direction when manufacturing the vibration motor 100.

The base 11 includes a first raised portion 11E and a second raised portion 11F. The first raised portion 11E and the second raised portion 11F are arranged in the first direction and formed by cutting and raising parts of the base 11. The first raised portion 11E extends upward through a through-hole 21A of the substrate 21. An inner wall surface of the third side portion 123 of the cover 12 is in contact with the first raised portion 11E, and an inner wall surface of the fourth side portion 124 is in contact with the second raised portion 11F. Thus, it is possible to position the cover 12 relative to the base 11 in the first direction when manufacturing the vibration motor 100.

In a state in which the cover 12 is attached to the base 11, one end portion of the substrate 21 in the first direction protrudes out of the cover 12.

The vibrating body 40 includes a magnet 41 and a weight 42. The magnet 41 includes first magnets 411 and 412 and a second magnet 413. The weight 42 has a hollow portion 421. The weight 42 is made of, for example, a tungsten alloy. The hollow portion 421 extends through the weight 42 in the up-down direction. The magnet 41 is disposed in the hollow portion 421. The magnet 41 is disposed above the coil 31. Alternatively, the hollow portion 421 need not extend through the weight 42 in the up-down direction and may be a recess in which the magnet 41 can be disposed.

The elastic member 50 includes a first fixing portion 51, a second fixing portion 52, a plate spring portion 53, a top plate portion 54, a flat plate portion 55, a first connection portion 56, and a second connection portion 57. These portions are integrated with each other. The plate spring portion 53 includes a first beam 531, a second beam 532, and a connection portion 533. The first beam 531, which has a flat plate-like shape, faces the second beam 532, which has a flat plate-like shape, in the first direction. The connection portion 533 connects an end portion of the first beam 531 to an end portion of the second beam 532. To an end portion of the second beam 532 away from the connection portion 533, an end portion of the second fixing portion 52 is connected. The second fixing portion 52 is bent in the first direction at a middle part thereof. The second fixing portion 52 is fixed to a side surface of the weight 42 that extends in the first direction. That is, the second beam 532 is fixed to the vibrating body 40 via the second fixing portion 52.

The first fixing portion 51 is connected to an end portion of the first beam 531 away from the connection portion 533. The first fixing portion 51 is fixed to an inner wall surface of the third side portion 123 of the cover 12. That is, the first beam 531 is connected to the casing via the first fixing portion 51. Thus, the elastic member 50 is disposed between the stationary portion and the vibrating body 40.

The top plate portion 54 is connected to an end portion of the second fixing portion 52 away from the plate spring portion 53 via the first connection portion 56. The first connection portion 56 has a shape that is bent so as to extend from the second fixing portion 52 first in the upward direction and then in the second direction. The first connection portion 56 is connected to one end portion of one edge of the top plate portion 54 extending in the first direction. The top plate portion 54 is disposed above the vibrating body 40 in the up-down direction. The top plate portion 54 faces the magnet 41 in the up-down direction.

The flat plate portion 55 is connected to an end portion of the second fixing portion 52 away from the plate spring portion 53 via the second connection portion 57. The second connection portion 57 has a shape that is bent so as to first separate from the second fixing portion 52 in the first direction and then approach the second fixing portion 52. Thus, the flat plate portion 55, which is connected to the second connection portion 57, faces the second fixing portion 52 in the second direction.

The elastic member 60 has the same structure as the elastic member 50. One end portion of the elastic member 60 is fixed to a side surface of the weight 42 extending in the first direction. The one end portion of the elastic member 60 is located at a position that is diagonal to the position to which the elastic member 50 is fixed. The other end portion of the elastic member 60 is fixed to an inner wall surface of the fourth side portion 124 of the cover 12. Thus, the vibrating body 40 is supported by the elastic members 50 and 60 so as to be vibratable in the first direction (one direction) relative to the stationary portion. A part of the substrate 21, the coil 31, the vibrating body 40, and the elastic members 50 and 60 are disposed in an inner space formed by the cover 12 and the base 11.

In the vibration motor 100 having such a structure, an electric current is supplied to the coil 31 through wires in the substrate 21. When the electric current flows through the coil 31, the vibrating body 40 vibrates in the first direction due to interaction between a magnetic field generated by the coil 31 and a magnetic field generated by the magnet 41.

1-2. Structure of Magnet

As described above, the magnet 41 includes the first magnets 411 and 412 and the second magnet 413. That is, the magnet 41 is constituted by three magnets.

Figure 2:
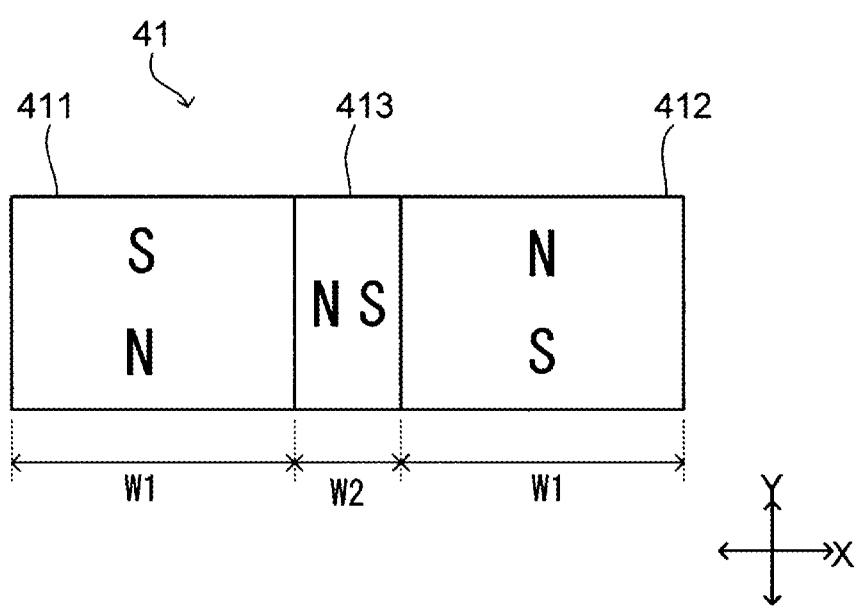
FIG. 2 illustrates the arrangement of magnetic poles when a magnet is seen in a second direction.

FIG. 2 illustrates the arrangement of magnetic poles when the magnet 41 is seen in the second direction. The first magnet 411 and the first magnet 412 are arranged in the first direction. The second magnet 413 is interposed between the first magnet 411 and the first magnet 412.

In the first magnet 411, a magnetic pole in an upper part thereof in the up-down direction is the south pole and a magnetic pole in a lower part thereof in the up-down direction is the north pole. In the first magnet 412, a magnetic pole in an upper part thereof is the north pole and a magnetic pole in a lower part thereof is the south pole. That is, a set of the first magnets 411 and 412 generate magnetic forces that are opposite to each other in the up-down direction.

In the second magnet 413, a magnetic pole in a part thereof adjacent to the first magnet 411 is the north pole and a magnetic pole in a part thereof adjacent to the first magnet 412 is the south pole. That is, the second magnet 413 is interposed between the first magnets 411 and 412 and generates a magnetic force in the first direction (one direction).

Thus, the magnet 41 has a so-called Halbach array structure that is formed by the first magnets 411 and 412 and the second magnet 413. The first magnets 411 and 412 have a function of driving the vibrating body 40. The second magnet 413 has an auxiliary function of forming a magnetic path. The first magnets 411 and 412 have the same width W1 in the first direction. The width W1 is larger than the width W2 of the second magnet 413 in the first direction. Since the second magnet 413 is auxiliary, the width of the second magnet 413 is smaller than the width of each of the first magnets 411 and 412.

Due to the Halbach array structure, when the size of the magnet 41 is increased, it is possible to form a magnetic path and to increase the magnetic force without increasing the thickness of the top plate portion 54. Thus, it is possible to increase the speed of starting and stopping the vibration motor 100 and to improve the responsiveness of the vibration motor 100.

Figure 3A:
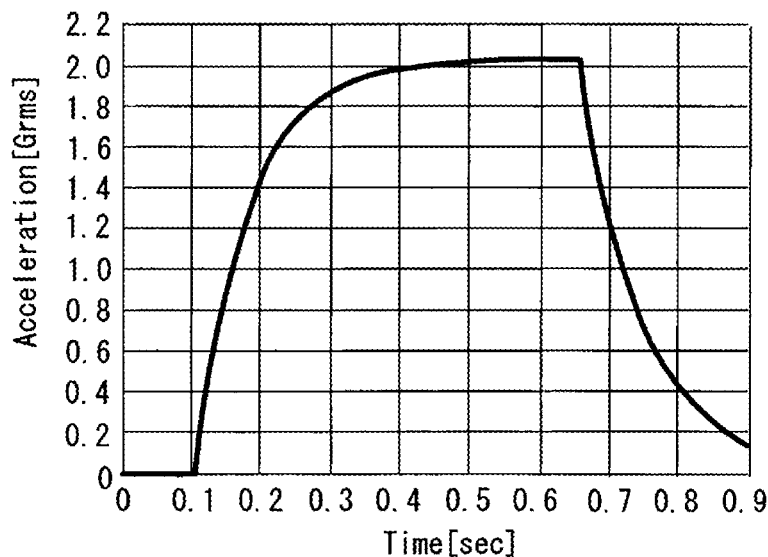
FIG. 3A is a graph illustrating an example of starting and stopping of a vibration motor according to a comparative example.
Figure 3B:
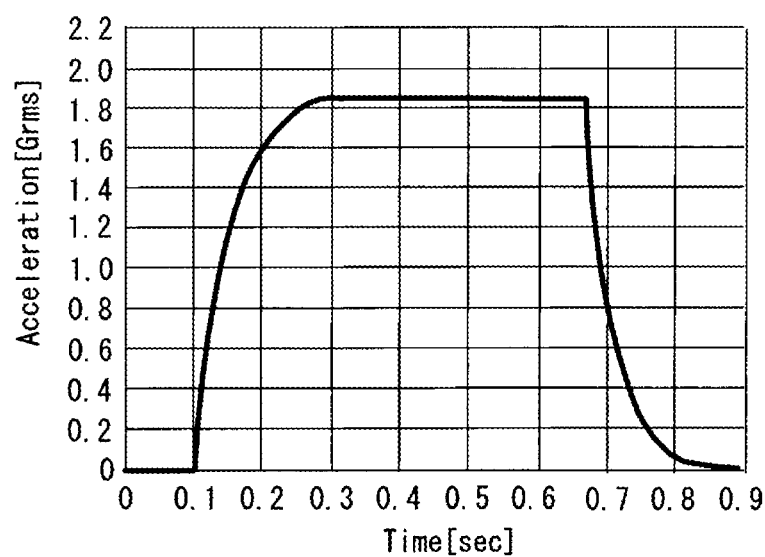
FIG. 3B is a graph illustrating an example of starting and stopping of the vibration motor according to the first embodiment.

FIG. 3A is a graph illustrating an example of starting and stopping of a vibration motor according to a comparative example, which is used for comparison with the present embodiment. In the vibration motor according to the comparative example, the vibrating body includes two magnets and the top plate is disposed on the magnets as in the vibration motor described in CN 202435225 U. FIG. 3B is a graph illustrating an example of starting and stopping of the vibration motor 100 according to the present embodiment.

Here, a jig, composed of steel plates, was suspended by wires at four corners of the jig; each of the vibration motors according to the comparative example and the present embodiment was fixed to the jig; and, in this state, the vibration motor was activated and the vibration amount of the jig was measured. In each of FIGS. 3A and 3B, the horizontal axis represents the time and the vertical axis represents the vibration amount of the jig. Each of FIGS. 3A and 3B represents the behavior of the jig in a case where driving of the coil was started at time 0.1 seconds and driving of the coil was stopped at time 0.65 seconds.

In FIG. 3B according to the present embodiment, the starting speed with which the vibration amount of the vibration body increases from zero to the peak is higher than that in FIG. 3A according to the comparative example. In FIG. 3B, the stopping speed with which the vibration amount of the vibration body decreases from the peak to zero is higher than that in FIG. 3A. Thus, with the present embodiment, the responsiveness of the vibration motor 100 can be increased while attempting to reduce the thickness of the vibration motor 100, and therefore the vibration motor 100 has a structure particularly suitable for tactile feedback and the like.

In the present embodiment, it is necessary to reduce the size of the weight 42 in order to provide a space for disposing the second magnet 413. However, it is possible to suppress decrease in the weight of the vibrating body 40 by disposing the second magnet 413 in the weight 42.

Figure 4:
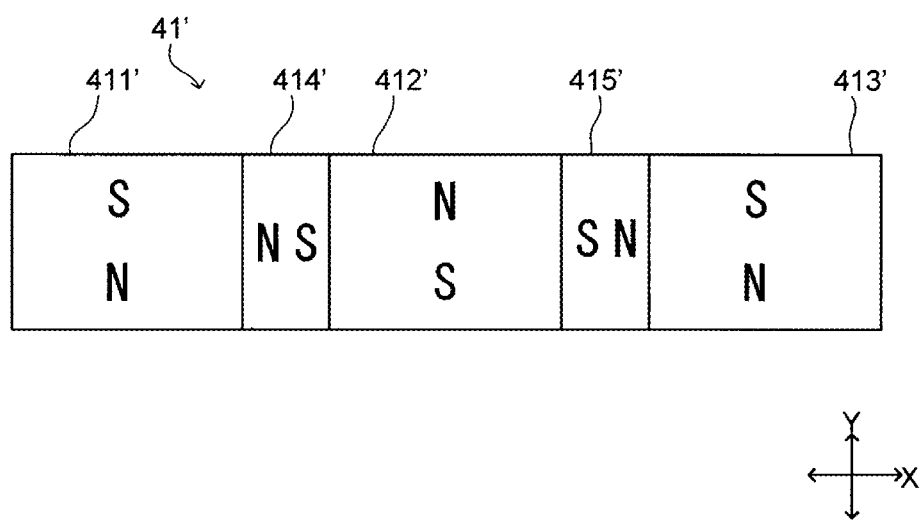
FIG. 4 illustrates the arrangement of magnetic poles when a magnet according to a modification is seen in the second direction.

The number of magnets is not limited to three as in the magnet 41 described above. The number of magnets may be an odd number larger than or equal to five. For example, FIG. 4 illustrates the arrangement of magnetic poles of a magnet 41' including five magnets. FIG. 4 corresponds to FIG. 2.

The magnet 41' illustrated in FIG. 4 includes first magnets 411', 412', and 413' and second magnets 414' and 415'. The first magnets 411', 412', and 413' are arranged in the first direction. Each of pairs of the first magnets 411', 412', and 413' that are adjacent to each other generate magnetic forces that are opposite to each other in the up-down direction. The second magnet 414' is interposed between the first magnet 411' and the first magnet 412'. The second magnet 415' is interposed between the first magnet 412' and the first magnet 413'. The second magnets 414' and 415' each generate a magnetic force in the first direction.

That is, the number of the first magnets 411', 412', and 413' arranged in the first direction is three. The second magnet 414' is interposed between a pair of the first magnets 411' and 412' that are adjacent to each other, and the second magnet 415' is interposed between a pair of the first magnets 412' and 413' that are adjacent to each other.

The magnet 41' also has a Halbach array structure. Therefore, it is possible to form a magnetic path by using the auxiliary second magnets 414' and 415' without increasing the thickness of the top plate portion. Since the magnet 41' includes three first magnets, the necessary number of coils is two, which is smaller than the number of the first magnets by one. Alternatively, the number of the first magnets may be four or more.

1-3. Process of Manufacturing Vibration Motor

A process of manufacturing the vibration motor 100 will be described. First, a step of fixing the elastic member to the casing and the vibrating body will be described.

Figure 5A:
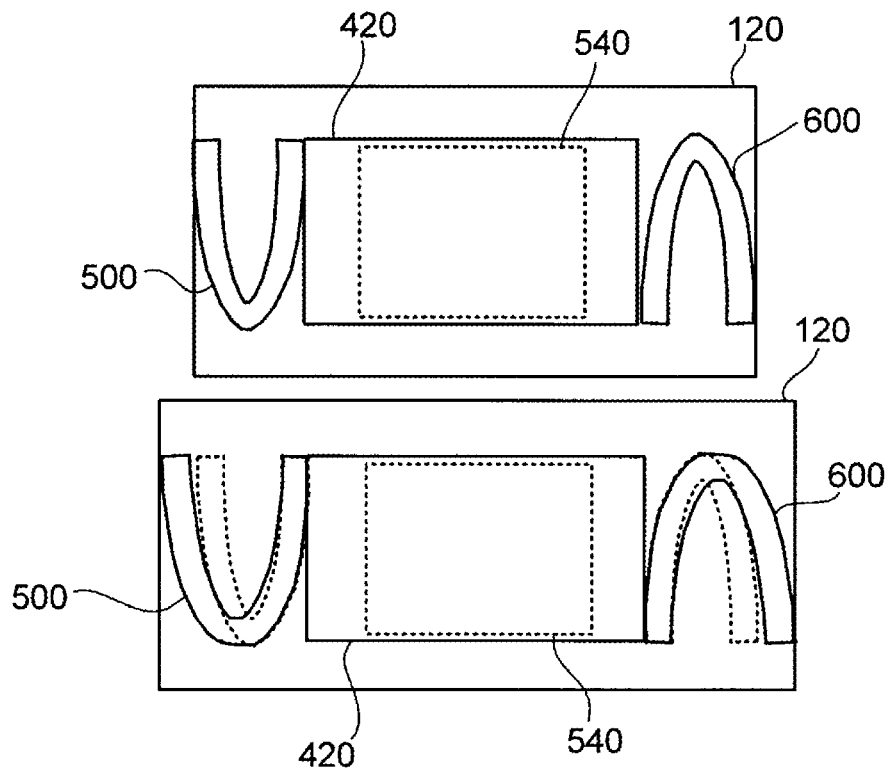
FIG. 5A is a plan view illustrating a method of fixing of an elastic member to a cover and a weight in a process of manufacturing the vibration motor according to the comparative example.

FIG. 5A illustrates a method of fixing of elastic members 500 and 600 to a cover 120 and a weight 420 in a process of manufacturing a vibration motor according to a comparative example, which is used for comparison with the present embodiment. FIG. 5A is a plan view seen from below.

In FIG. 5A, a top plate portion 540 is independent from the elastic members 500 and 600 and disposed above the weight 420. The top plate portion 540 is fixed to the weight 420 by welding or the like. In a state in which the weight 420 is disposed in the cover 120, one end portions of the elastic members 500 and 600 are respectively fixed to inner wall surfaces of side portions of the cover 120 that face each other in the first direction by welding. The other end portions of the elastic members 500 and 600 are respectively fixed to side surfaces of the weight 420 that face each other in the first direction by welding.

In the upper part of FIG. 5A, because the width of the cover 120 in the first direction is a predetermined width, substantially no elastic force is applied to the elastic members 500 and 600 in an initial state in which the elastic members 500 and 600 are fixed. Due to lot-to-lot variation or the like, the length of the cover 120 in the first direction may vary within a tolerance. Due to such variation, the length of the cover 120 in the first direction in the lower part of FIG. 5A is slightly larger than that in the upper part of FIG. 5A.

In the lower part of FIG. 5A, it is necessary to fix one end portions of the elastic members 500 and 600 to the inner wall surfaces of the cover 120 by elastically deforming the elastic members 500 and 600 from the state shown in the upper part of FIG. 5A. Accordingly, in an initial state of the vibration motor, excessive forces are applied to the elastic members 500 and 600. When the vibration motor starts operating, larger forces are applied to the elastic members 500 and 600, and the elastic members 500 and 600 may break. Due to variation of the cover 120, the length of the cover 120 in the first direction may be slightly short. Also in this case, excessive forces are applied to the elastic members 500 and 600 in an initial state and in an operating state.

Figure 5B:
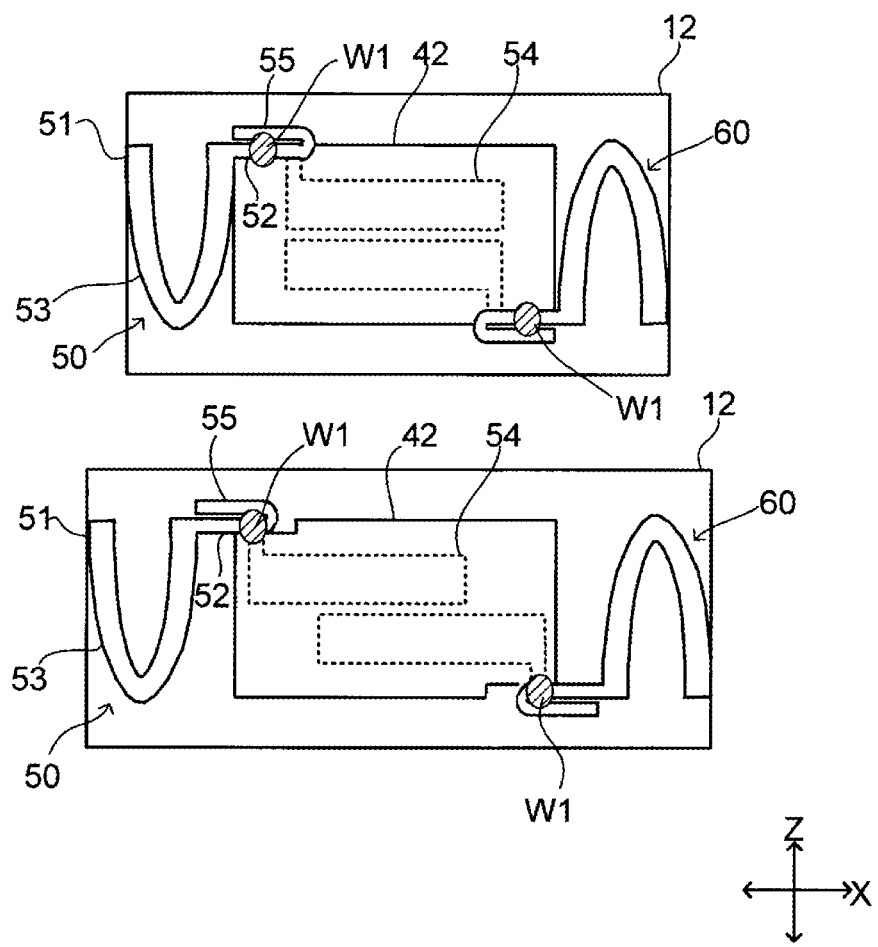
FIG. 5B is a plan view illustrating a method of fixing of an elastic member to a cover and a weight in a process of manufacturing the vibration motor according to the first embodiment.

FIG. 5B illustrates a method of fixing of the elastic members 50 and 60 to the cover 12 and the weight 42 in the process of manufacturing the vibration motor 100 according to the present embodiment. FIG. 5B is a schematic plan view seen from below.

The top plate portion 54, which is connected to the second fixing portion 52, is integrated with the elastic member 50. The same applies to the top plate portion of the elastic member 60. Thus, as illustrated in the upper part and the lower part of FIG. 5B, even if the length of the cover 12 in the first direction varies within a tolerance, by adjusting the positions of the elastic members 50 and 60 in the first direction, it is possible to fix the first fixing portions of the elastic members 50 and 60 to the inner wall surfaces of the cover 12 by welding and to fix the second fixing portions of the elastic members 50 and 60 to the side surfaces of the weight 42 via welds W1. The welds W1 are formed by welding from below. Accordingly, irrespective of the length of the cover 12, it is possible to suppress application of excessive forces to the elastic members 50 and 60 and to suppress breakage of the elastic members 50 and 60 in an initial state of the vibration motor 100.

The elastic member 50 includes the flat plate portion 55, which is connected to the second fixing portion 52 and faces the second fixing portion 52 in the second direction. The elastic member 60 also includes a similar flat plate portion. A portion to be welded needs to have a sufficient thickness. With the structure in which the elastic members 50 and 60 include the flat plate portions, it is possible to provide a sufficient thickness to a portion to be welded and to perform welding without using an independent plate member or the like. Accordingly, it is possible to perform welding efficiently. Moreover, the flat plate portions can be easily formed by bending.

Figure 6:
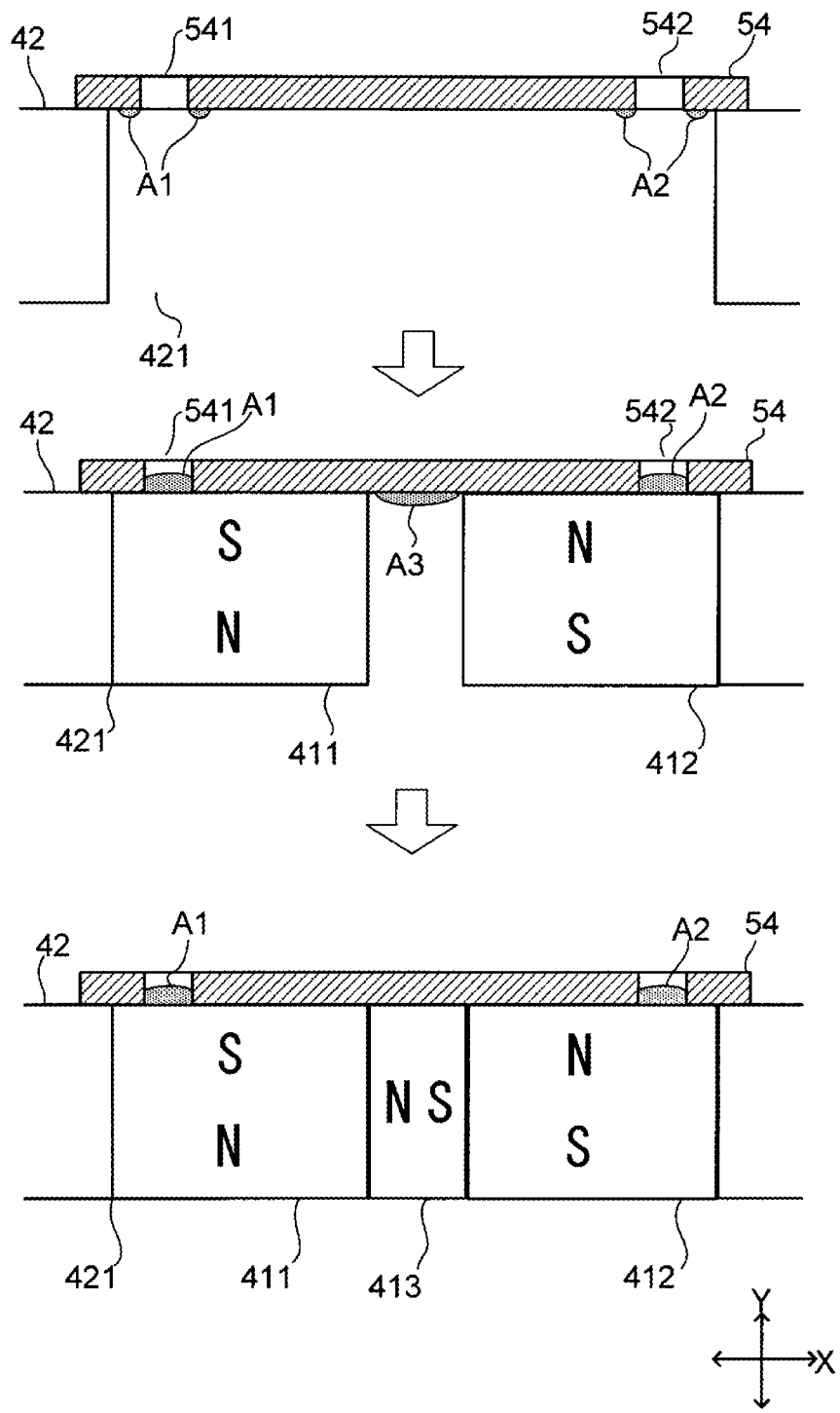
FIG. 6 illustrates an example of a step of fixing a magnet to a weight

Next, a step of fixing the magnet 41 to the weight 42 will be described. FIG. 6 illustrates an example of the step of fixing the magnet 41 to the weight 42. FIG. 6 is a schematic sectional view seen in the second direction. FIG. 6 illustrates a method of fixing of the magnet 41 to the weight 42 via the top plate portion 54 of the elastic member 50. However, the top plate portion of the elastic member 60 and the top plate portion 54 are arranged in in the second direction (see FIG. 1), and the magnet 41 is fixed to the weight 42 via the top plate portion of the elastic member 60 in the same way as shown in FIG. 6.

The top plate portion 54 has through-holes 541 and 542, which face the first magnets 411 and 412 in the up-down direction. The through-holes 541 and 542 are arranged in the first direction.

First, as illustrated in the upper part of FIG. 6, in a state in which the elastic member 50 is fixed to the weight 42, an adhesive A1 is applied to a part of a lower surface of the top plate portion 54 around the through-hole 541 and an adhesive A2 is applied to a part of the lower surface of the top plate portion 54 around the through-hole 542. The adhesives A1 and A2 are disposed in the hollow portion 421 of the weight 42. The adhesives A1 and A2 are, for example, anaerobic adhesives.

Next, as illustrated in the middle part of FIG. 6, the first magnet 411 is inserted into the hollow portion 421 so as to close the bottom of the through-hole 541. Thus, the first magnet 411 and the top plate portion 54 are fixed to each other by the adhesive A1, and a part of the adhesive A1 flows into and remains in the through-hole 541. Likewise, the first magnet 412 is inserted into the hollow portion 421 so as to close the bottom of the through-hole 542. Thus, the first magnet 412 and the top plate portion 54 are fixed to each other by the adhesive A2, and a part of the adhesive A2 flows into and remains in the through-hole 542. Then, an adhesive A3 is poured into the space between the first magnet 411 and the first magnet 412. The adhesive A3 is, for example, an anaerobic adhesive.

Next, as illustrated in the lower part of FIG. 6, the second magnet 413 is fitted into the space between the first magnet 411 and the first magnet 412. Thus, the second magnet 413 is fixed to the top plate portion 54 by the adhesive A3.

Figure 7:
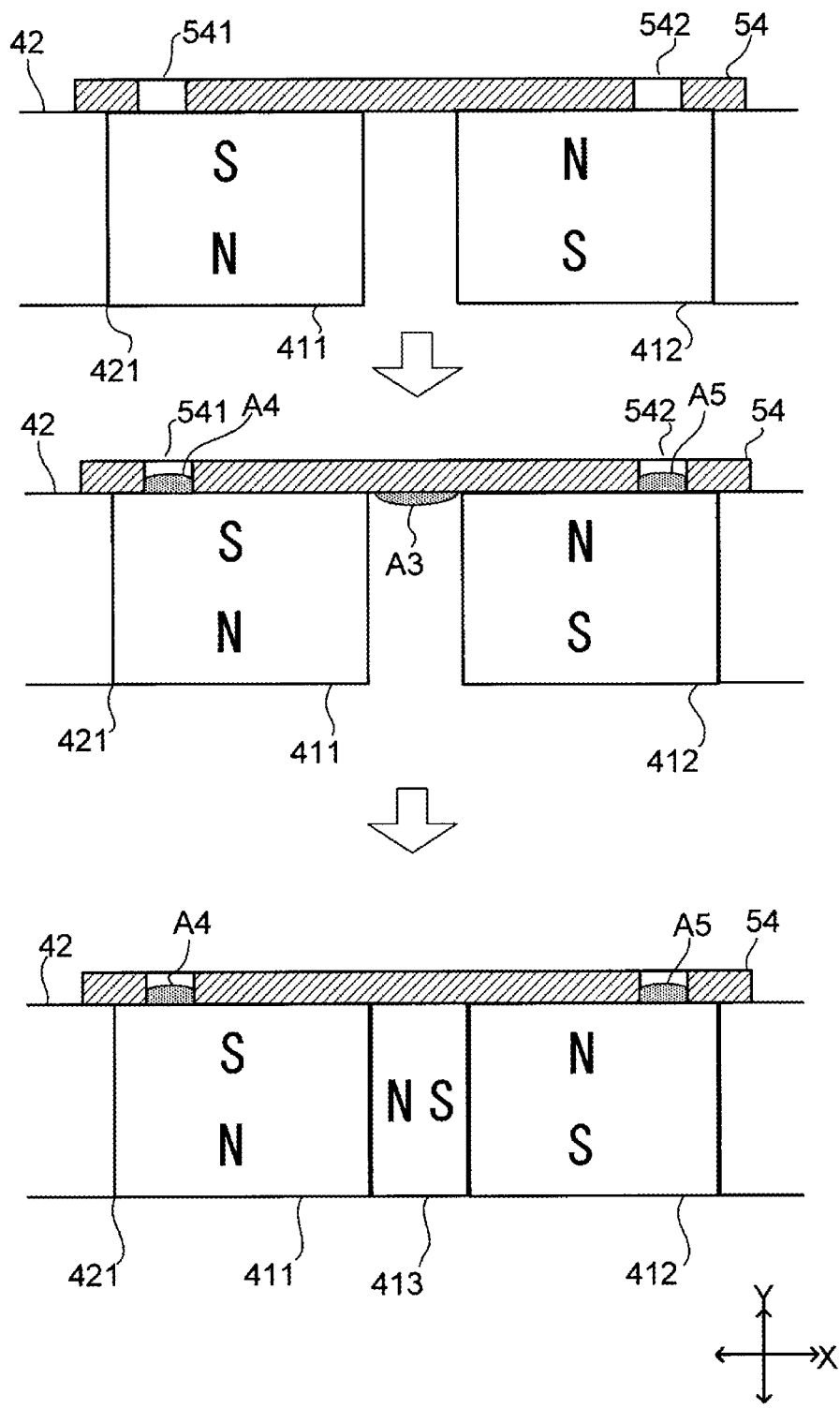
FIG. 7 illustrates another example of the step of fixing the magnet to the weight

FIG. 7 illustrates another example of the step of fixing the magnet 41 to the weight 42. In this step, as illustrated in the upper part of FIG. 7, in a state in which the elastic member 50 is fixed to the weight 42, the first magnets 411 and 412 are inserted into the hollow portion 421.

Then, an adhesive A4 is inserted into the through-hole 541 from above. Thus, the first magnet 411 is fixed to the top plate portion 54 by the adhesive A4. Likewise, an adhesive A5 is inserted into the through-hole 542 from above. Thus, the first magnet 412 is fixed to the top plate portion 54 by the adhesive A5.

A step of pouring the adhesive A3 into a space between the first magnet 411 and the first magnet 412 and fixing the second magnet 413 to the top plate portion 54 by the adhesive A3 (shown in the lower part of FIG. 7) is the same that shown in FIG. 6.

1-4. Modification of Top Plate Portion

Figure 8:
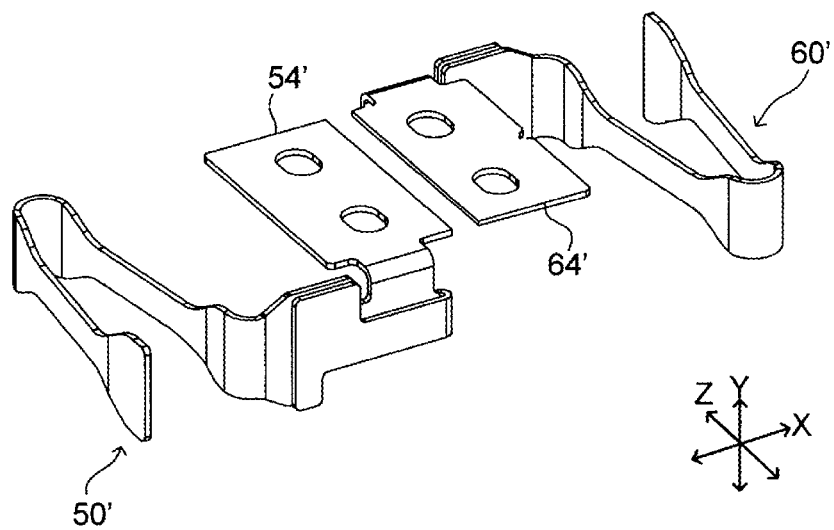
FIG. 8 is a perspective view of elastic members each including a modification of a top plate portion.

The top plate portion may be modified as follows. FIG. 8 is a perspective view of elastic members 50' and 60' each including a modification of the top plate portion. The elastic member 50' illustrated in FIG. 8 includes a top plate portion 54'. The elastic member 60' illustrated in FIG. 8 includes a top plate portion 64'. That is, the top plate portion 54' is integrated with the elastic member 50', and the top plate portion 64' is integrated with the elastic member 60'.

Both of the top plate portions 54' and 64' are more elongated in the second direction than in the first direction. However, a gap is formed between the top plate portion 54' and the top plate portion 64', which are arranged in the first direction, and therefore magnetic flux of first magnets (not shown), which are disposed below the top plate portions, may leak through the gap.

For this reason, in the embodiment described above, both of the top plate portion 54 of the elastic member 50 and the top plate portion 54 of the elastic member 60 are more elongated in the first direction than in the second direction. Thus, leakage of magnetic flux can be suppressed, because the upper sides of the first magnets 411 and 412 are covered by one top plate portion.

2. Second Embodiment

Figure 9:
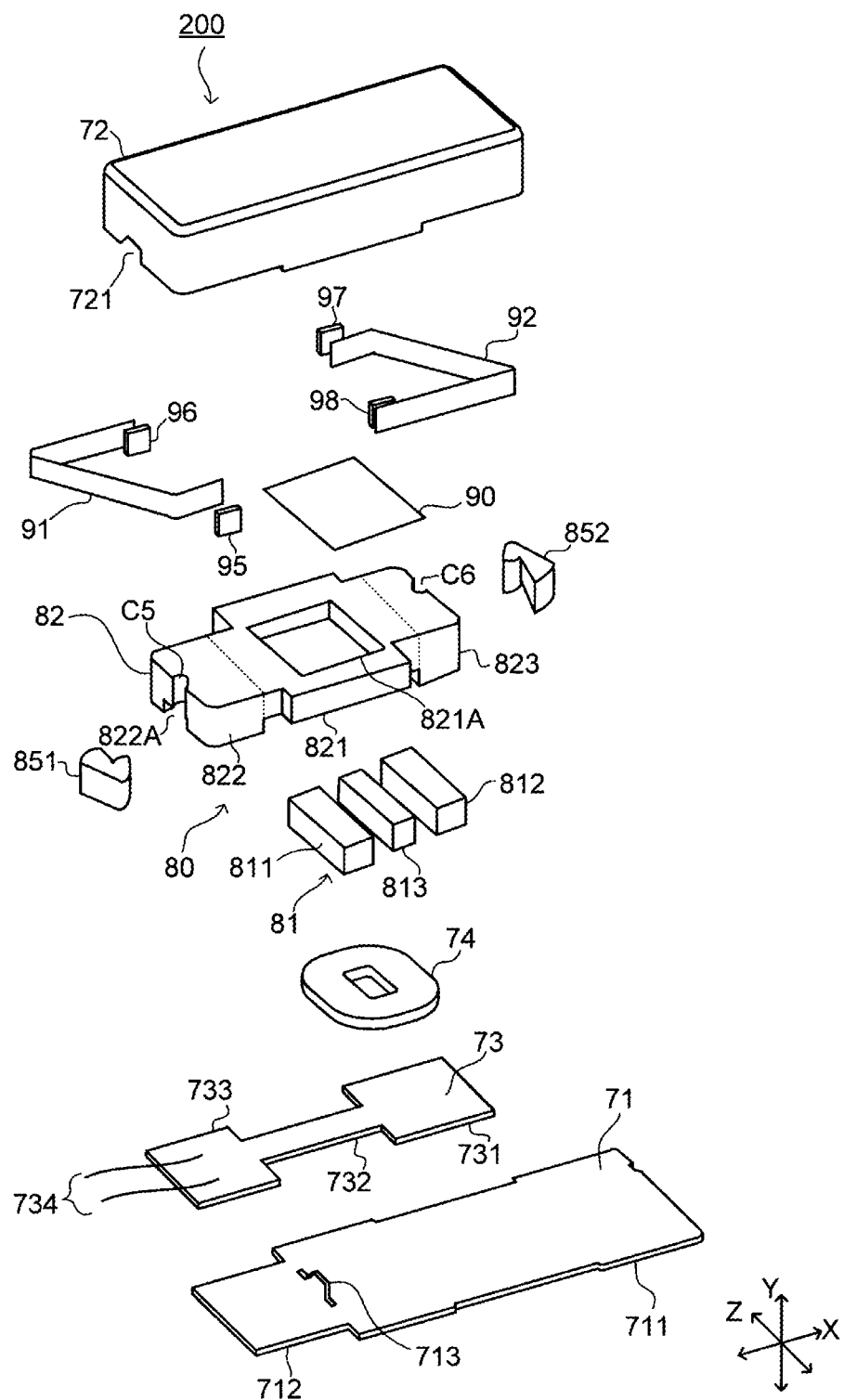
FIG. 9 is an exploded perspective view of a vibration motor according to a second embodiment of the present invention.

Next, a second embodiment of the present invention will be described. FIG. 9 is an exploded perspective view of a vibration motor 200 according to the second embodiment of the present invention.

The vibration motor 200 illustrated in FIG. 9 includes a base 71, a cover 72, a substrate 73, a coil 74, a vibrating body 80, damper members 851 and 852, a top plate portion 90, elastic members 91 and 92, and reinforcement plates 95 to 98.

The base 71 and the substrate 73 extend in the first direction (X-direction). The substrate 73 is disposed on the base 71. The coil 74 is disposed on the substrate 73. The base 71 and the cover 72 constitute a casing. The casing, the substrate 73, and the coil 74 constitute a stationary portion. That is, the vibration motor 200 includes a stationary portion that includes the casing and the coil 74.

The vibrating body 80 includes a magnet 81 and a weight 82. The weight 82 is made of, for example, a tungsten alloy. The weight 82 includes a first weight portion 821 and second weight portions 822 and 823. The second weight portions 822 and 823 are respectively disposed so as to be continuous with both ends of the first weight portion 821 in the one direction. The first weight portion 821 has a hollow portion 821A, which extends through the first weight portion 821 in the up-down direction. The magnet 81 includes a first magnet 811, a first magnet 812, and a second magnet 813. The magnet 81 is disposed in the hollow portion 821A. The magnet 81 is disposed above the coil 74.

The damper members 851 and 852 are made of, for example, foamed rubber (rubber sponge). The damper members 851 and 852 are fixed to both end surfaces of the weight 82 in the first direction.

The top plate portion 90 is independent from the elastic members 91 and 92. The top plate portion 90 faces the magnet 81 in the up-down direction and functions as a back yoke. The top plate portion 90 is fixed to the upper surface of the weight 82, for example, by welding or adhesive bonding.

Figure 10:
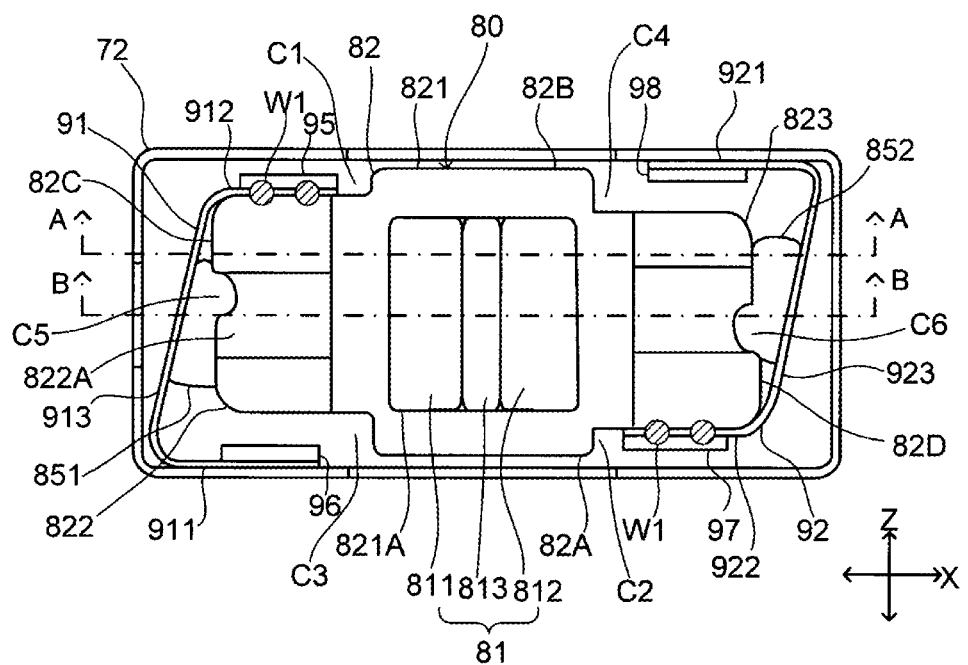
FIG. 10 is a plan view illustrating a structure in which an elastic member is fixed to a weight and a cover in the second embodiment seen from below.

Referring to FIG. 10, a structure for fixing the elastic members 91 and 92, the weight 82, and the cover 72 to each other will be described in detail. FIG. 10 is a plan view illustrating a structure in which the elastic members 91 and 92 are fixed to the weight 82 and the cover 72 seen from below.

The elastic member 91 includes a first fixing portion 911, a second fixing portion 912, and a connection portion 913. The elastic member 92 includes a first fixing portion 921, a second fixing portion 922, and a connection portion 923.

The weight 82 includes wall surfaces 82A to 82D. The wall surface 82B faces the wall surface 82A, which extends in the first direction. The wall surfaces 82C and 82D each connect the wall surface 82A to the wall surface 82B.

The first fixing portion 911 is fixed to a wall surface of the cover 72 that faces one end portion of the wall surface 82A in the first direction. A cutout portion C1 is formed in the one end portion of the wall surface 82B in the first direction in such a way that a part of the wall surface 82B including a corner is cut out. The second fixing portion 912 is fixed to the cutout portion C1. The connection portion 913 connects the first fixing portion 911 to the second fixing portion 912 and is located on one side of the wall surface 82C in the first direction.

The first fixing portion 921 is fixed to a wall surface of the cover 72 that faces the other end portion of the wall surface 82B in the first direction. The positions to which the first fixing portions 911 and 921 are fixed are located diagonal to each other. A cutout portion C2 is formed in the other end portion of the wall surface 82A in the first direction in such a way that a part of the wall surface 82A including a corner is cut out. The cutout portions C1 and C2 are located diagonal to each other. The second fixing portion 922 is fixed to the cutout portion C2. The connection portion 923 connects the first fixing portion 921 to the second fixing portion 922 and is located on one side of the wall surface 82D in the first direction. That is, the elastic members 91 and 92 are located between the stationary portion and the vibrating body 80.

By thus fixing the second fixing portion 912 to the cutout portion C1 and fixing the second fixing portion 922 to the cutout portion C2, it is possible to reduce the width of the cover 72 in the second direction while minimizing reduction in the weight of the weight 82. Accordingly, the size of the vibration motor 200 can be reduced.

With the structure for fixing the elastic members 91 and 92 to the cover 72 and to the weight 82, the vibrating body 80 is supported so as to be vibratable in the first direction relative to the stationary portion. When an electric current flows though the coil 74, the vibrating body 80 vibrates in the first direction due to interaction between a magnetic field generated by the coil 74 and a magnetic field generated by the magnet 81.

The structure of the first magnets 811 and 812 and the second magnet 813 is a Halbach array structure that is the same as the structure of the magnet shown in FIG. 2. That is, a set of the first magnets 811 and 812 generate magnetic forces that are opposite to each other in the up-down direction. The second magnet 813 is interposed between the first magnets 811 and 812 and generates a magnetic force in the first direction.

Thus, when the size of the magnet 81 is increased, it is possible to form a magnetic path without increasing the thickness of the top plate portion 90 and to increase the magnetic force. Accordingly, it is possible to increase the speed of starting and stopping the vibration motor 200 and to improve the responsiveness of the vibration motor 200.

As in the first embodiment, the number of magnets included the magnet 81, which has the Halbach array structure, is not limited to three. The number of magnets may be an odd number larger than or equal to five. In this case, the necessary number of coils is smaller than the number of the first magnets by one.

Referring again to FIG. 10, the reinforcement plate 95 is fixed to the second fixing portion 912. Thus, the reinforcement plate 95 is disposed in the cutout portion C1, and therefore it is possible to reinforce the second fixing portion 912 without increasing the width of the cover 72 in the second direction. Likewise, the reinforcement plate 97 is fixed to the second fixing portion 922 and disposed in the cutout portion C2. The weight 82, the second fixing portion 912, and the reinforcement plate 95 are fixed to each other by forming the welds W1 by performing welding from below. The weight 82, the second fixing portion 922, and the reinforcement plate 97 are fixed to each other in the same way. The method of fixing of the second fixing portion and the reinforcement plate to the weight 82 is not limited to the method described above and may be a method of performing welding from one side in the second direction.

The reinforcement plate 96 is fixed to the first fixing portion 911. A cutout portion C3 is formed in an end portion of the wall surface 82A in the first direction away from the cutout portion C2 in such a way that a part of the wall surface 82A including a corner is cut out. The reinforcement plate 96 is disposed in the cutout portion C3. The reinforcement plate 96 has a function of reinforcing the first fixing portion 911 and a function of restraining the position of the weight 82 so that the elastic member 91 may not break due to excessive movement of the weight 82 in the first direction when the vibration motor 200 drops.

Likewise, the reinforcement plate 98 is fixed to the first fixing portion 921. A cutout portion C4 is formed in an end portion of the wall surface 82B in the first direction away from the cutout portion C1 in such a way that a part of the wall surface 82B including a corner is cut out. The reinforcement plate 98 is disposed in the cutout portion C4. The reinforcement plate 98 has a function of reinforcing the first fixing portion 921 and a function of restraining the position of the weight 82 so that the elastic member 92 may not break due to excessive movement of the weight 82 in the first direction when the vibration motor 200 drops.

The first fixing portion and the reinforcement plate are fixed to the cover 72 by welding from one side in the second direction.

Next, a structure related to the damper members 851 and 852 will be described. The damper member 851 is disposed between the connection portion 913 and the wall surface 82C. The damper member 852 is disposed between the connection portion 923 and the wall surface 82D. Thus, it is possible to effectively damp the vibration of the vibrating body 80 when supply of electric current to the coil 74 is stopped. By providing the vibration motor with the damper members, compared with a case where they are not provided, it is possible to considerably shorten the period from the time when supply of electric current to the coil 74 is stopped to the time when the amplitude of the vibration of the vibrating body 80 becomes zero.

A cutout portion C5 is formed in the wall surface 82C, and a cutout portion C6 is formed in the wall surface 82D. The cutout portions C5 and C6 extend through the wall surfaces 82C and 82D in the up-down direction. However, for example, the cutout portions C5 and C6 need not extend through upper end portions of the wall surfaces 82C and 82D. Parts of the damper members 851 and 852 are respectively disposed in the cutout portions C5 and C6. Thus, it is possible to suppress removal of the damper members 851 and 852.

Figure 11:
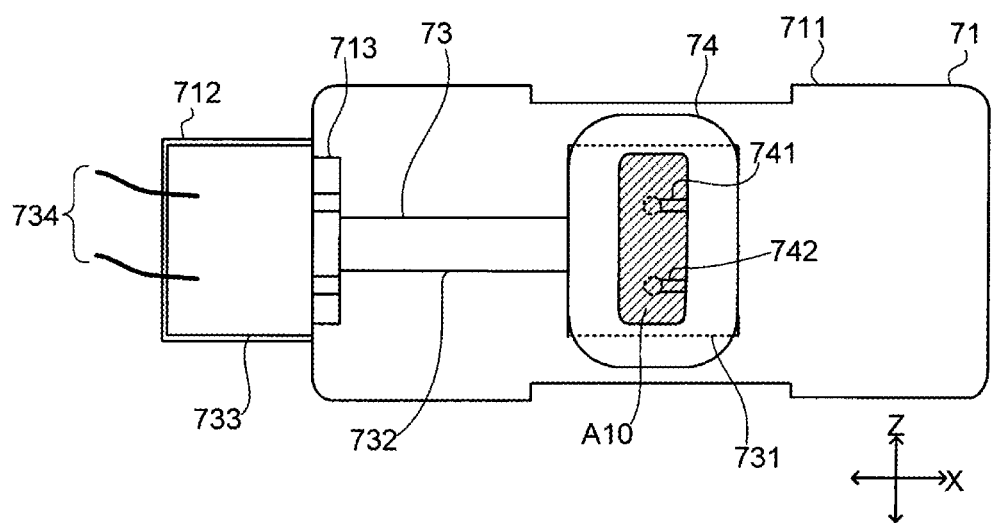
FIG. 11 is a plan view illustrating a structure including a base and adjacent components seen from above.

FIG. 11 is a plan view illustrating a structure including the base 71 and adjacent components seen from above. The base 71 includes a first plate portion 711 and a second plate portion 712. The second plate portion 712 protrudes in the first direction from one end portion of the first plate portion 711 in the first direction.

The substrate 73 includes a substrate body 731, an extension portion 732, a wide portion 733, and two lead wires 734. The coil 74 is placed on the substrate body 731. The extension portion 732 extends from the substrate body 731 in the first direction. The wide portion 733 is connected to one end portion of the extension portion 732 in the first direction. The width of the wide portion 733 in the second direction is larger than that of the extension portion 732. The lead wires 734 extend from the wide portion 733.

The substrate body 731 and the extension portion 732 are disposed on the first plate portion 711. The wide portion 733 is disposed on the second plate portion 712. The boundary between the extension portion 732 and the wide portion 733 is disposed on the outer edge of one end portion of the first plate portion 711 in the first direction. The base 71 includes a raised portion 713, which is raised upward. The raised portion 713 is independent from the first plate portion 711 and fixed to the first plate portion 711 at the boundary between the extension portion 732 and the wide portion 733. The raised portion 713 is fixed to the first plate portion 711 by, for example, welding.

The raised portion 713 has a through-hole that extends in the first direction. The extension portion 732 extends through the through-hole. Thus, the raised portion 713 restricts upward lifting of the extension portion 732, and it is possible to suppress breakage of wires in the extension portion 732 due to contact with the vibrating body 80.

If the extension portion 732 extends to the position of the wide portion 733 while maintaining its width, it is possible to insert the extension portion 732 into the raised portion 713 even if the raised portion 713 is formed by cutting an raising the base 71.

A cutout portion 721 is formed in one end surface of the cover 72 in the first direction so as to correspond to the raised portion 713 (see FIG. 9). The cover 72 is attached to the first plate portion 711 so that the cutout portion 721 covers the raised portion 713 from above. Thus, the substrate body 731, the extension portion 732, the coil 74, the vibrating body 80, the damper members 851 and 852, the top plate portion 90, the elastic members 91 and 92, and the reinforcement plates 95 to 98 are disposed in the space surrounded by the cover 72 and the first plate portion 711.

That is, the extension portion 732 extends from the substrate body 731 to the outside of the casing in the first direction, and the wide portion 733 and the lead wires 734 are disposed outside of the casing. Alternatively, the extension portion may extend in the second direction from the substrate body 731 to the outside of the casing.

The coil 74 includes lead wires 741 and 742. The lead wires 741 and 742 are connected to electrodes of the substrate body 731 at positions inside of the coil 74 by soldering or the like. Thus, it is possible to suppress breakage of the lead wires 741 and 742 due to contact with the vibrating body 80 that may occur if the lead wires 741 and 742 extend to the outside of the coil 74. The lead wires 734 are electrically connected to the coil 74, and a voltage can be applied from the outside to the coil 74 through the lead wires 734.

An adhesive portion A10 is formed inside of the coil 74 by filling the inside of the coil 74 with an adhesive and curing the adhesive. Thus, it is possible to suppress breakage of the lead wires 741 and 742 that may occur if the lead wires 741 and 742 are lifted upward and contact the vibrating body 80.

Figure 12A:
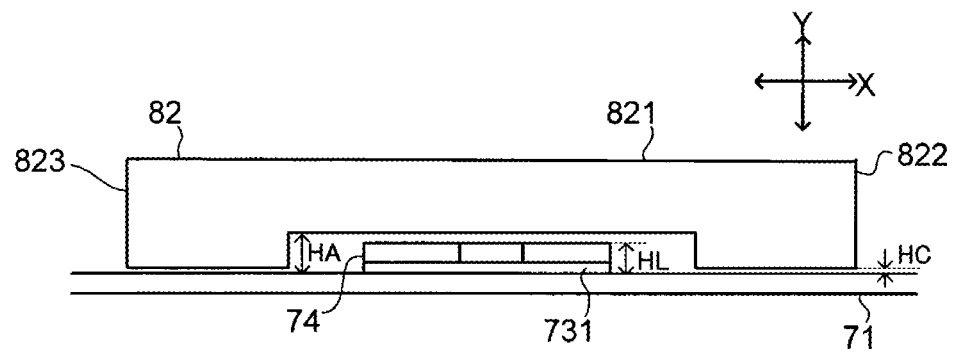
FIG. 12A is a partial sectional view of the vibration motor taken along line XIIA-XIIA in FIG. 10.
Figure 12B:
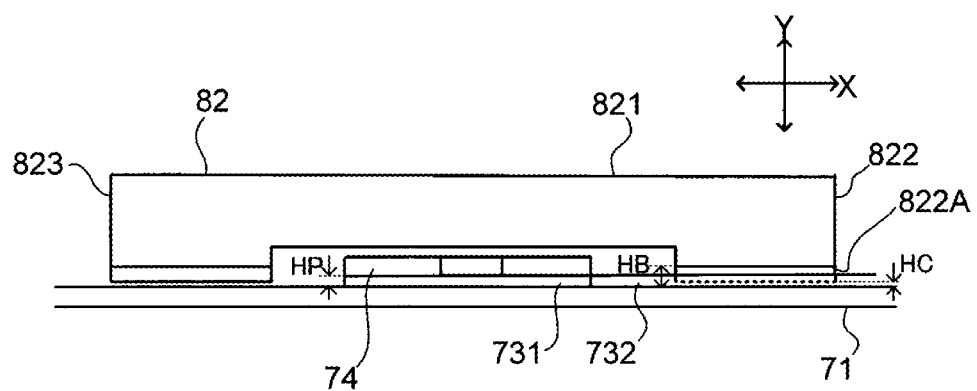
FIG. 12B is a partial sectional view of the vibration motor taken along line XIIB-XIIB in FIG. 10.

FIG. 12A is a partial sectional view of the vibration motor 200 taken along line XIIA-XIIA in FIG. 10. FIG. 12B is a partial sectional view of the vibration motor 200 taken along line XIIB-XIIB in FIG. 10.

In the weight 82, the second weight portions 822 and 823 are disposed adjacent to both ends of the first weight portion 821 in the first direction. The first weight portion 821 is disposed above the coil 74. The lower surfaces of the second weight portions 822 and 823 are located below the lower surface of the first weight portion 821. Lower parts of the second weight portions 822 and 823 face the coil 74 in the first direction. Thus, even if the second weight portions 822 and 823 move downward due to dropping of the vibration motor 200 or the like, the second weight portions 822 and 823 contact the base 71 before the first weight portion 821 contacts the coil 74. Accordingly, it is possible to suppress breakage of the coil 74 due to contact with the first weight portion 821.

A groove 822A, which extends in the first direction, is formed in a lower part of the second weight portion 822. The extension portion 732 is disposed in the groove 822A. Thus, even if the weight 82 moves downward due to dropping of the vibration motor 200 or the like, it is possible to suppress contact of the weight 82 with the extension portion 732.

Let HA denote the height from the base 71 to the lower surface of the first weight portion 821, HB denote the height from the base 71 to the groove 822A, HL denote the height from the base 71 to the upper surface of the coil 74, and HP denote the height from the base 71 to the upper surface of the substrate 73. Then, in the present embodiment, a relationship HA>HL>HB>HP is satisfied. Another relationship HA>HB>HL may be satisfied. However, it is possible to minimize HB when the former relationship is satisfied. That is, the depth of the groove 822A can be made smaller, and the weight 82 can have sufficient weight.

In addition to the above relationship, in the present embodiment, a relationship HP≥HC is satisfied, where HC is the height from the base 71 to the lower surface of the second weight portion 822. Thus, it is possible to minimize HC and to increase the distance between the lower surface of the second weight portion 822 and the lower surface of the first weight portion 821. As a result, the weight 82 can have sufficient weight.

Figure 13:
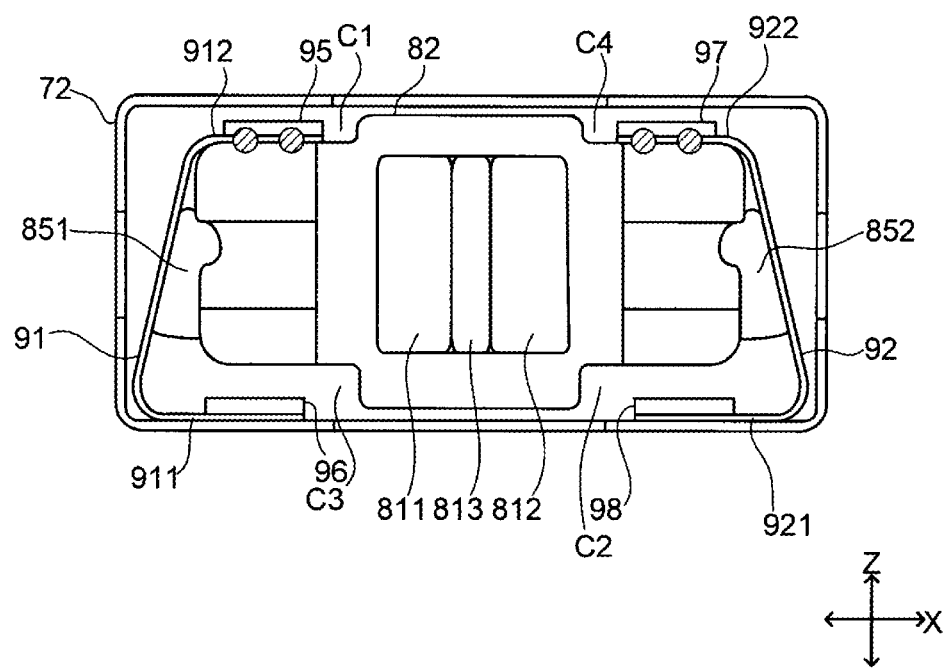
FIG. 13 is a plan view illustrating a structure including a weight, an elastic member, and a cover according to a modification of the second embodiment of the present invention seen from below.

FIG. 13 is a plan view illustrating a structure including a weight, an elastic member, and a cover according to a modification of the second embodiment of the present invention seen from below. FIG. 13 corresponds to FIG. 10 described above.

The modification illustrated in FIG. 13 differs from the second embodiment illustrated in FIG. 10 in the method of fixing the elastic members 91 and 92 to the weight 82. In the modification, the second fixing portion 912 of the elastic member 91 is fixed to the cutout portion C1 of the weight 82, and the second fixing portion 922 of the elastic member 92 is fixed to the cutout portion C4 of the weight 82. Since the cutout portions C1 and C4 are arranged in the first direction, the positions at which the second fixing portions 912 and 922 are fixed are arranged in the first direction. The reinforcement plate 95 is fixed to the second fixing portion 912 in the cutout portion C1, and the reinforcement plate 97 is fixed to the second fixing portion 922 in the cutout portion C4. Also with such a structure, the width of the cover 72 in the second direction can be reduced while maximizing the weight of the weight 82.

The first fixing portion 911 of the elastic member 91 is fixed to a wall surface of the cover 72 that faces the cutout portion C3, which faces the cutout portion C1 in the second direction. The reinforcement plate 96 is fixed to the first fixing portion 911 in the cutout portion C3. The first fixing portion 921 of the elastic member 92 is fixed to a wall surface of the cover 72 that faces the cutout portion C2, which faces the cutout portion C4 in the second direction. The reinforcement plate 98 is fixed to the first fixing portion 921 in the cutout portion C2. That is, the positions at which the first fixing portions 911 and 921 are fixed to the cover 72 are arranged in the first direction. The reinforcement plates 96 and 98 restrain movement of the weight 82 in the first direction and can suppress breakage of the elastic members 91 and 92 due to excessive movement of the weight 82.

3. Others

The embodiments of the present invention described above can be modified in various ways within the sprit and scope of the present invention.

For example, the structures of the first embodiment and the second embodiment may be used in combination as appropriate. For example, the structure of the weight in the second embodiment, which is constituted by the first weight portion and the second weight portion, may be used for the structure of the weight in the first embodiment. The structures of the base, the substrate, and the coil in the second embodiment may be used in the first embodiment.

The present invention can be used for a vibration motor that is included in, for example, a smartphone or a game pad.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration motor comprising:
   a stationary portion including a casing and a coil;
   a vibrating body including a weight and a magnet, the vibrating body being supported so as to be vibratable in one direction relative to the stationary portion;
   an elastic member located between the stationary portion and the vibrating body; and
   a top plate portion that is disposed above the vibrating body in an up-down direction that is perpendicular to the one direction, wherein
   the magnet is disposed above the coil,
   the top plate portion faces the magnet in the up-down direction,
   the magnet includes a set of first magnets that generate magnetic forces that are opposite to each other in the up-down direction and one or more second magnets that are interposed between the first magnets and each generate a magnetic force in the one direction,
   the weight includes a first weight portion that is disposed above the coil and a second weight portion whose lower surface is located below a lower surface of the first weight portion,
   the second weight portion faces the coil in the one direction,
   the stationary portion further includes a substrate,
   the substrate includes a substrate body on which the coil is disposed and an extension portion that extends from the substrate body in the one direction toward an outside of the casing, the second weight portion includes a groove that extends in the one direction and in which the extension portion is disposed, the casing includes a base, the substrate is disposed on the base, and a relationship HA>HL>HB>HP is satisfied, where HA is a height from the base to the lower surface of the first weight portion, HB is a height from the base to the groove, HL is a height from the base to an upper surface of the coil, and HP is a height from the base to an upper surface of the substrate.

2. The vibration motor according to claim 1,
wherein the elastic member includes a fixing portion that is fixed to a side surface of the weight, and
wherein the top plate portion is connected to the fixing portion and integrated with the elastic member.

3. The vibration motor according to claim 2,
wherein the elastic member includes a flat plate portion that is connected to the fixing portion and that faces the fixing portion in a direction that is perpendicular to the one direction and the up-down direction.

4. The vibration motor according to claim 3,
wherein the top plate portion is more elongated in the one direction than in the direction that is perpendicular to the one direction and the up-down direction.

5. The vibration motor according to claim 4,
wherein the top plate portion has a through-hole at a position that faces the first magnet in the up-down direction.

6. The vibration motor according to claim 5,
wherein a width of each of the first magnets in the one direction is larger than a width of each of the one or more second magnets in the one direction.

7. The vibration motor according to claim 1,
wherein a relationship HP≥HC is satisfied, where HC is a height from the base to the lower surface of the second weight portion.

8. The vibration motor according to claim 7,
wherein a lead wire of the coil is connected to the substrate at a position inside of the coil.

9. The vibration motor according to claim 8,
wherein an adhesive portion is disposed inside of the coil.

10. The vibration motor according to claim 9,
wherein the base includes a raised portion that is raised upward,
wherein the raised portion has a through-hole extending therethrough in the one direction, and
wherein the extension portion extends through the through-hole.

11. The vibration motor according to claim 10,
wherein the number of the first magnets that are arranged in the one direction is three or more, and
wherein each of the one or more second magnets is interposed between a corresponding pair of the first magnets that are adjacent to each other.

12. The vibration motor according to claim 1,
wherein the elastic member includes a first fixing portion, a second fixing portion, and a connection portion,
wherein the weight includes a first wall surface that extends in the one direction, a second wall surface that faces the first wall surface, and a third wall surface that connects the first wall surface to the second wall surface,
wherein a first cutout portion is formed in one end portion of the second wall surface in the one direction in such a way that a part of the second wall surface including a corner is cut out,
wherein the first fixing portion is fixed to a wall surface of the casing, the wall surface facing one end portion of the first wall surface in the one direction,
wherein the second fixing portion is fixed to the first cutout portion, and
wherein the connection portion connects the first fixing portion to the second fixing portion and is located on one side of the third wall surface in the one direction.

13. The vibration motor according to claim 12, further comprising:
a first reinforcement plate that is fixed to the second fixing portion.

14. The vibration motor according to claim 13, further comprising:
a second reinforcement plate that is fixed to the first fixing portion,
wherein a second cutout portion is formed in the one end portion of the first wall surface in the one direction in such a way that a part of the first wall surface including a corner is cut out, and
wherein the second reinforcement plate is disposed in the second cutout portion.

15. The vibration motor according to claim 14, further comprising:
a damper member,
wherein the damper member is disposed between the connection portion and the third wall surface.

16. The vibration motor according to claim 15,
wherein a third cutout portion is formed in the third wall surface, and
wherein a part of the damper member is disposed in the third cutout portion.

* * * * *